United States Patent [19]
Meissner

[11] Patent Number: 5,529,291
[45] Date of Patent: Jun. 25, 1996

[54] CIRCULATING FLUIDIZED BED DIRECT REDUCTION SYSTEM

[75] Inventor: David C. Meissner, Charlotte, N.C.

[73] Assignee: Midrex International B.V. Rotterdam, Zurich Branch, Zurich, Switzerland

[21] Appl. No.: 399,449

[22] Filed: Mar. 7, 1995

Related U.S. Application Data

[62] Division of Ser. No. 289,852, Aug. 12, 1994, Pat. No. 5,431,711.

[51] Int. Cl.⁶ .................................. C22B 15/14
[52] U.S. Cl. .................. 266/156; 266/157; 266/160; 266/172
[58] Field of Search .................. 266/172, 156, 266/157, 160

[56] References Cited

U.S. PATENT DOCUMENTS

| | | | |
|---|---|---|---|
| Re. 32,247 | 8/1986 | Stephens, Jr. | 75/11 |
| 2,821,471 | 1/1958 | Sellers | 75/444 |
| 3,246,978 | 4/1966 | Porter, Jr. | 75/26 |
| 3,311,466 | 3/1967 | Curlook | 75/26 |
| 3,475,160 | 10/1969 | Heinzelmann | 75/26 |
| 3,565,790 | 2/1971 | Schwarzenbek | 23/288 |
| 4,134,907 | 1/1979 | Stephens, Jr. | 260/449.6 M |
| 4,257,781 | 3/1981 | Stephens, Jr. | 48/197 R |
| 4,260,412 | 4/1981 | Summers | 75/35 |
| 4,358,310 | 11/1982 | Sanzenbacher | 75/25 |
| 5,073,194 | 12/1991 | Stephens | 75/376 |
| 5,082,251 | 1/1992 | Whipp | 266/142 |
| 5,118,479 | 6/1992 | Stephen, Jr. | 423/148 |
| 5,137,566 | 8/1992 | Stephens, Jr. | 75/507 |
| 5,192,486 | 3/1993 | Whipp | 266/172 |

FOREIGN PATENT DOCUMENTS

| | | |
|---|---|---|
| 0571358 | 11/1993 | European Pat. Off. . |
| 2633691 | 9/1984 | Germany . |
| 0571358 | 5/1993 | Germany . |
| 4240194 | 6/1994 | Germany . |
| WO92/02824 | 2/1992 | WIPO . |

OTHER PUBLICATIONS

Hirsch, et al.; *Circofer—a concept of CFB reduction of fine ores with coal*; Metallurgical Plant and Technology International May/1993; pp. 42–47.

Hirsh, Martin et al *Metallurgical Plant and Technology International* May/1993 pp. 42–47.

*Primary Examiner*—Melvyn Andrews
*Attorney, Agent, or Firm*—Ralph H. Dougherty; Scott E. Hanf

[57] ABSTRACT

A method and apparatus for producing direct reduced iron from iron oxide fines. The iron oxide raw material is conducted through a series of circulating fluidizable beds in which the fluidizing gas is a strong reducing gas mixture, which allows intimate contact between the fines and the reducing gas to facilitate the direct reduction of the iron oxide fines to metallized iron.

15 Claims, 2 Drawing Sheets

CIRCULATING FLUIDIZED BED DIRECT REDUCTION SYSTEM

This application is a division of application No. 08/289,852, Aug. 12, 1994, now U.S. Pat. No. 5,431,711.

FIELD OF THE INVENTION

The present invention relates to a method and apparatus for metallization of metal oxide fines by a circulating fluidizable bed direct reduction system.

DESCRIPTION OF THE PRIOR ART

Applicant is aware of the following U.S. Patents concerning fluidized beds used in the direct reduction of iron ore.

| U.S. Pat. No. | Inventor | Issue Date | Title |
|---|---|---|---|
| 4,134,907 | Stephens, Jr. | 01-16-79 | PROCESS FOR ENHANCING THE FUEL VALUE OF LOW BTU GAS |
| 4,257,781 | Stephens, Jr. | 03-24-81 | PROCESS FOR ENHANCING THE FUEL VALUE OF LOW BTU GAS |
| 4,260,412 | Summers et al. | 04-07-81 | METHOD OF PRODUCING DIRECT REDUCTION IRON WITH FLUID BED COAL GASIFICATION |
| 4,358,310 | Sanzenbacher et al. | 11-09-82 | DRY COLLECTION OF OF METALLIZED FINES |
| 5,073,194 | Stephens et al. | 12-17-91 | PROCESS FOR CONTROLLING THE PRODUCT QUALITY IN THE CONVERSION OF REACTOR FEED INTO IRON CARBIDE |
| 5,118,479 | Stephens, Jr. | 06-02-92 | PROCESS FOR USING FLUIDIZED BED REACTOR |
| 5,137,566 | Stephens, Jr. et al. | 08-11-92 | PROCESS FOR PREHEATING IRON-CONTAINING REACTOR FEED PRIOR TO BEING TREATED IN A FLUIDIZED BED REACTOR |
| Re. 32,247 | Stephens, Jr. | 09-16-86 | PROCESS FOR THE DIRECT PRODUCTION OF STEEL |
| WO 92/02824 | Hager, et al. | 02-20-92 | METHOD FOR CONTROLLING THE CONVERSION OF IRON CONTAINING REACTOR FEED INTO IRON CARBIDE |

BACKGROUND OF THE INVENTION

Direct reduction of iron from iron oxide pellets, lump ore, or other iron oxide containing feed material is usually performed in of a direct reduction furnace, such as a vertical shaft furnace. The feed material usually contains a significant proportion of finely divided material, or "fines" often created by abrasion of the pellets or lumps during handling. Direct reduction is carried out by contacting the feed material with hot reducing gases rich in carbon monoxide and hydrogen. The reducing gas is passed through a metal oxide containing burden in the furnace and withdrawn from the top of the furnace, along with metal oxide material in the form of finely divided particles. The fines must be separated from the gas, and heretofore must have been disposed of. Such disposal has usually taken the form of placing the fines into stock piles or attempting to mix the fines with some binder to form a usable material.

The present invention treats these removed fines by reducing them to metallized iron, which can be utilized in other processes. This dramatically reduces the amount of waste fines for disposal.

Stephens, Jr. U.S. Pat. No. 4,134,907 teaches a process for increasing the fuel value of a gas mixture of carbon monoxide and hydrogen by converting part of the hydrogen and part of the carbon in the carbon monoxide of the gas mixture to methane, which comprises continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gas mixture including carbon monoxide and hydrogen having a substantially increased fuel value over the gas mixture introduced into the fluid bed.

Stephens, Jr. U.S. Pat. No. 4,257,781 teaches a process which uses coal resources more economically for industry by converting part of the hydrogen and part of the carbon in the carbon monoxide of the gas mixture to methane, by continuously introducing the gas mixture into a fluid bed in the presence of iron under conditions of pressure and temperature which promote the reduction of carbon monoxide to carbon, the formation of iron carbide from the iron and carbon, and the formation of methane and iron from iron carbide and hydrogen, and continuously removing from the fluid bed a methane enriched gels mixture including carbon monoxide and hydrogen having a substantially increased fuel value over the gas mixture introduced into the fluid bed.

Summers U.S. Pat. No. 4,260,4412 teaches a method of producing direct reduced iron with fluid bed coal gasification in which a portion of cooled, recycled gas is used as coolant in the gasification chamber and a second portion of the cleaned recycled gas is heated and mixed with the hot, dust-free gasification gas to form reducing gas for the direct reduction process. Limestone is preferably mixed with the pulverized coal feed to the gasification chamber to desulfurize the gas.

Sanzenbacher U.S. Pat. No. 4,358,310 teaches a method and apparatus for the dry collection of metallized fines from a direct reduction furnace cooling zone in which cooling gas removed from the cooling zone passes through a dust collector and the removed dust is cooled in a fluidized bed, the fluidizing gas being recirculated through an indirect cooler. The process is continuous and the fines are collected at a sufficiently low temperature for easy handling. The apparatus includes a hot gas cyclone in the cooling gas withdrawal line connected to a fluidized bed cooler, a conduit for withdrawing fluidizing gas from the fluidized bed cooler passes through a second cyclone dust collector then through an indirect cooler and returns to the fluidized bed cooler. Cool fines are withdrawn from the fluidized bed cooler into a collector.

Stephens et al. U.S. Pat. No. 5,073,194 teaches a method of controlling product quality in a conversion of reactor feed to an iron carbide-containing product in a fluidized bed reactor. A Mossbauer analysis is performed on product samples leaving the fluidized bed reactor, and a regression analysis is performed on the Mossbauer data. Depending upon the results of the regression analysis, process parameters are adjusted in order to obtain a product having a desired composition. Adjustments are made to the temperature and pressure in the fluidized bed reactor, rate of feed to the fluidized bed reactor, and the composition of the process gas which reacts with the reactor feed in the fluidized bed reactor, dependent upon the analysis results.

Stephens, Jr. et al. U.S. Pat. No. 5,118,479 teaches a process in which the fluidized bed reactor includes a baffle system to ensure the proper residence time of the feed materials. The fluidized bed reactor also provides a novel method for reducing the negative effects of thermal expansion in the reactor.

Stephens, Jr. et al. U.S. Pat. No. 5,137,566 teaches a process for the conversion of reactor feed to iron carbide. The process includes the step of preheating the reactor feed in an oxidizing atmosphere. The iron carbide produced by the process is particularly useful in the production of steel.

Stephens, Jr. U.S. Pat. No. Re. 32,247 teaches a process for the direct production of steel from particulate iron oxides or concentrates including two major steps in which in Step (1) the iron oxides are converted to iron carbide and in Step (2) steel is produced directly from the carbide in the basic oxygen furnace or the electric furnace. In the production of the carbide the oxides are reduced and carburized in a single operation using a mixture of hydrogen as a reducing agent and carbon bearing substances such as propane primarily as carburizing agents. Iron carbide thus produced is introduced as all or part of the charge into a basic oxygen furnace to produce steel directly without the blast furnace step. In order to make the steel making process auto-thermal, heat is supplied either by using the hot iron carbide from Step (1) or preheating the iron carbide or by including sufficient fuel in the iron carbide to supply the required heat by combustion.

Hager et al. European Patent WO 92/02824 teaches a process for controlling the conversion of reactor feed to iron carbide. The reactor feed is subjected to a process gas in a fluidized bed reactor (10), and measurements (56) are taken of individual gases in the off-gas from this reaction and the temperature (64) and pressure (66). A stability phase diagram is generated based on the temperature. Different regions of the stability phase diagram are representative of different products being formed by the conversion of the reactor feed. Based on concentrations of the individual gases in the off-gas and the total pressure, a point is plotted on the stability phase diagram indicative of the favored reaction product. The process parameters can then be adjusted to insure that iron carbide can be produced from the reactor feed based on the stability phase diagram.

SUMMARY OF THE INVENTION

The invention is a new method and apparatus for the direct reduction of oxide fines. The fines are separated from larger particles, and transported to a series of circulating fluidizing beds. Reduction gas from a reducing gas reformer is introduced to the series of circulating fluidizing beds.

The reducing gas from the reformer enters the circulating fluidized bed having containing fines having the highest degree of reduction. The reducing gas is passed upwardly through a bed of solid iron oxide fine particles with a sufficient velocity for the particles to separate from one another and become freely supported in a fluid-like state. At this point the total fluid frictional force of the particles is equal to or greater than the effective weight of the bed. This creates intimate contact between solid and gas, with high rates of heat transfer and uniform temperatures within the bed, facilitating the reduction of iron oxide into iron, and forming byproduct gasses of water and carbon dioxide.

OBJECTS OF THE INVENTION

The principal object of the invention is to provide an improved method of processing iron oxide fines.

A further object of this invention is to provide a method of reducing iron oxide fines directly to iron efficiently and avoiding blowing the vast majority of fines through the system without being reduced or collected in the pollution control equipment.

Another object of the invention is to provide apparatus for processing of fines that can utilize gas reformers and scrubbers already developed for shaft reduction furnaces.

BRIEF DESCRIPTION OF THE DRAWINGS

The foregoing and other objects will become more readily apparent by referring to the following detailed description and the appended drawings in which.

DETAILED DESCRIPTION

The present invention has the ability to process iron oxide fines. Because of the size and weight of the iron oxide fines, they cannot be introduced into a shaft furnace because they are too light and would be blown back by the top gas and exit the system. Therefore, a process has been needed to accomplish effective processing of the fines.

Figure 1:
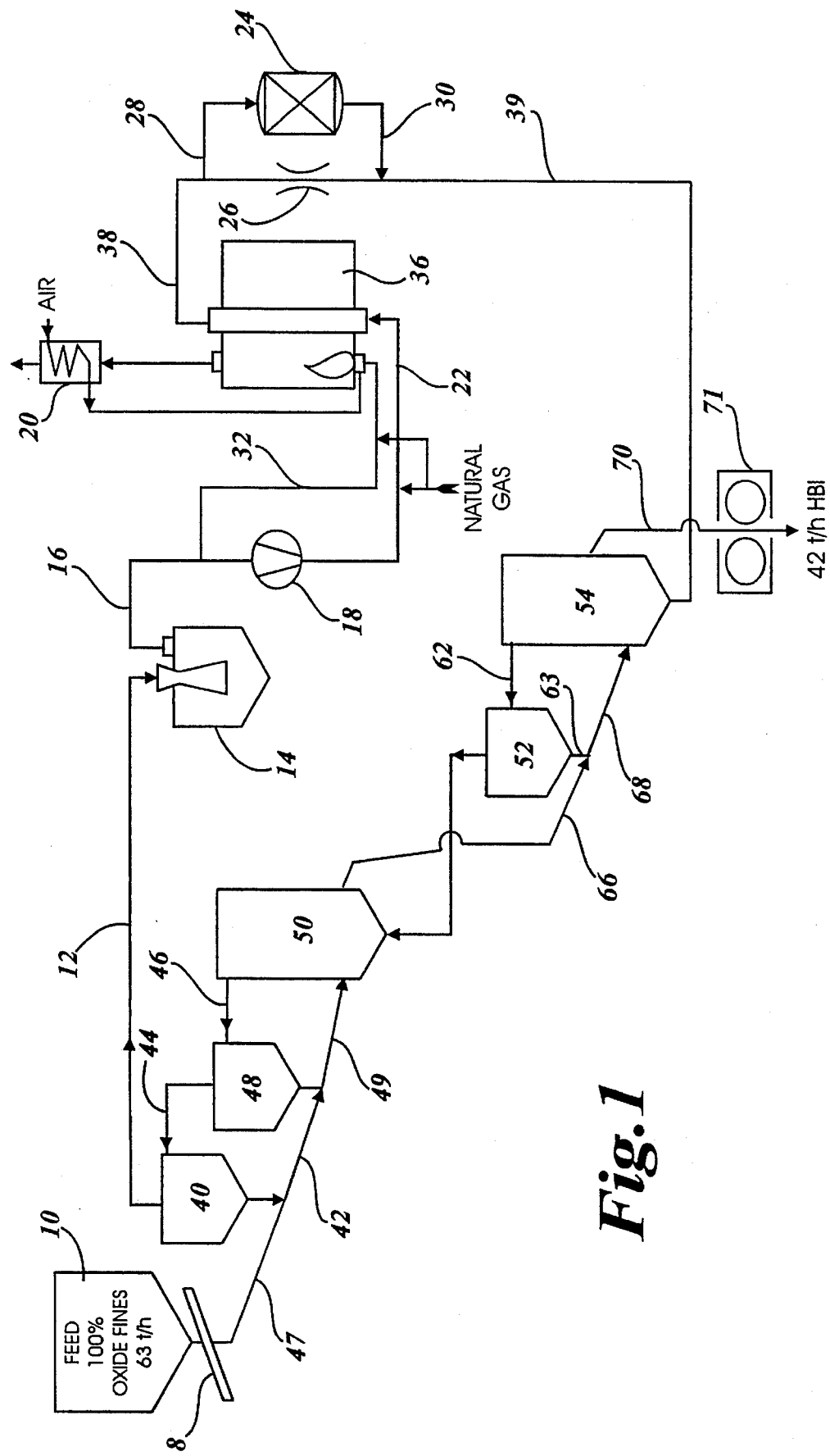
FIG. 1 is a schematic diagram of the process for direct reduction for iron oxide fines.

When the metal oxide fines enter the system from hopper 10, FIG. 1, they are removed from any larger particles by separation unit 8, which can be simply a screen which allows the fine particles to pass through the openings in the screen. Any larger particles such as lumps and pellets remain on the top of the screen and can later be removed for processing in a different manner. The fines are then conducted through a feed pipe 47 where they are joined by more iron oxide fines from cyclones 40 and 48 and moved through pipe 49 into the circulating fluidizable bed 50 where direct reduction of the fines takes place through interaction with the reducing gas.

Circulating Fluid Beds (CFB) have distinct advantages over a bubbling fluid bed for the following reasons: first, CFB's use smaller particles of iron ore which reduces residence time required for reduction; second, CFB's have lower inventory of reduced material which reduces over burden pressure which in turn reduces sticking tendencies; third, CFB's have a higher heat transfer and mass transfer coefficients due to higher gas velocity in CFB, which results in lower residence time for reduction; and forth, surface area with smaller particles is much larger which increases heat transfer, mass transfer and pore diffusion.

The spent reducing gas exiting cyclone 40 is conducted through spent gas pipe 12 into scrubber 14 for cooling and removal of particulates before the cleaned gas enters pipe 16, passes through valve 18 and feed pipe 22 into gas reformer 36.

Natural gas is then introduced through pipe 34 into the reformer 36 wherein the mixture of the natural gas, and top gas from the scrubber 14 is reformed to produce the reducing gas for the system.. Reducing gas consisting principally of hydrogen and carbon monoxide is removed from the reformer through pipe 38, then passes through monitor 26, which measures the temperature of the gas and can be constricted responsive to the gas temperature to divert a portion of the reducing gas through pipe 28, gas cooler 24 and pipe 30 into pipe 39 wherein cooled gas is mixed with the hot gas to form a tempered reducing gas, then introduced into the final circulating fluidizable bed 54. This gas exits the circulating fluidizable bed through pipe 62 from which it passes into the cyclone 52 which throws the heavy particles such as the iron oxide fines to the outside of the unit where their weight pulls them out of the gas stream and they fall to the bottom of the cyclone and exiting into pipe 63 in which they are mixed with the fine particles from the preceding circulating fluidizable bed 50 through pipe 66. Fines from pipe 68 enter the final circulating fluidizable bed 54 for final reduction. Finally, the reduced iron fines exit the circulating fluidizable bed 54 through pipe 70 and are agglomerated in a hot briquetter 71, or they may be simply collected for later processing.

Figure 2:
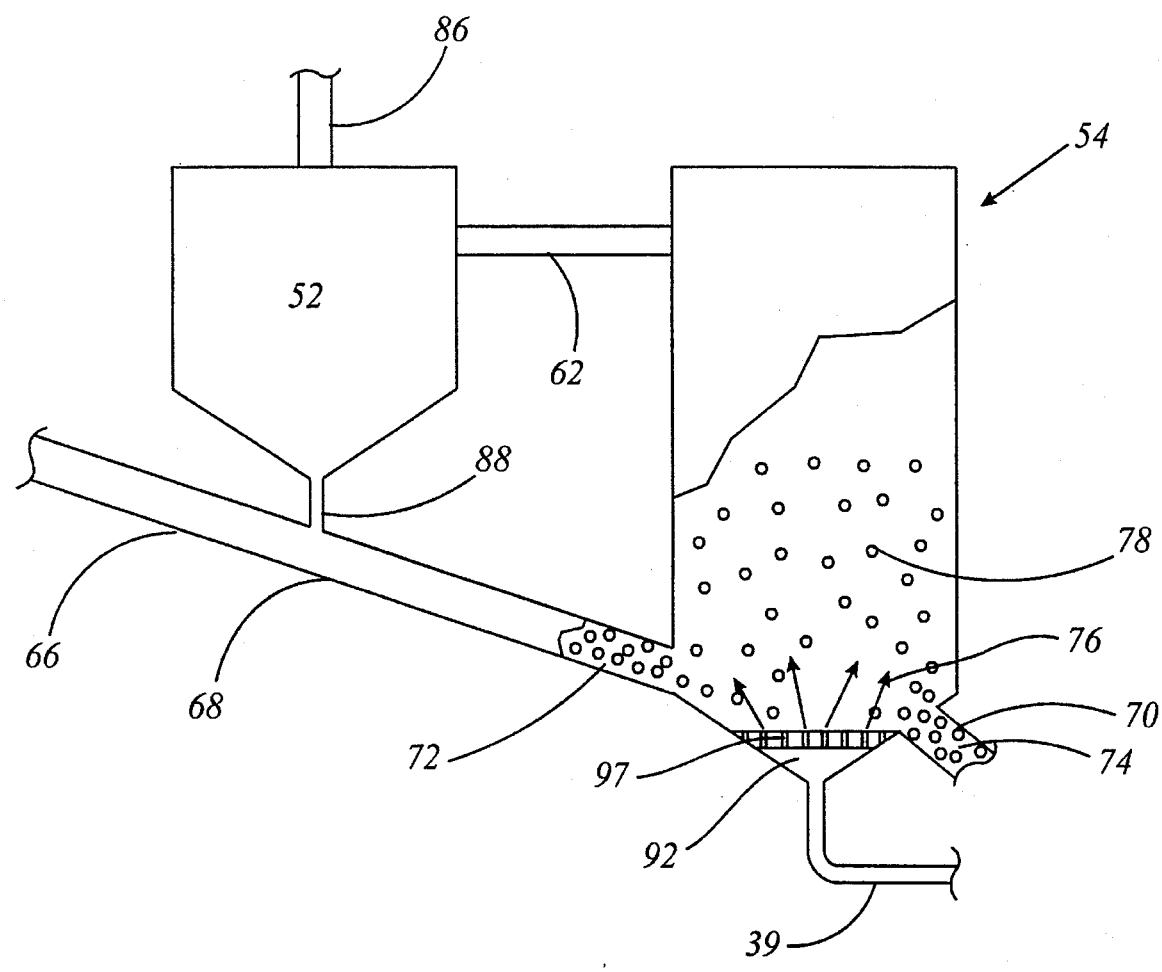
FIG. 2 is an enlarged schematic diagram of one of the circulating fluidizable beds and associated cyclone in the series of beds used in the direct reduction of the iron oxide fines.

FIG. 2 shows an enlarged view of the circulating fluidizable bed 54. Feed pipe 68 contains iron oxide fines 72 from cyclone 52 and any preceding circulating fluidizable beds and introduces the fines into the circulating fluidizable bed 54. The reducing gas flows from feed pipe 39 into gas dispersion chamber 92 in the bottom of the circulating fluidizable bed 54. The reducing gases pass through an orifice-containing plate 97, upward through a bed of solid iron oxide fine particles 78 with a sufficient velocity for the particles to separate from one another and become freely supported in a fluid-like state. When fluidized, the total fluid friction force of the particles is equal to or greater than the effective weight of the bed. This provides intimate contact between the solids and gas with high rates of heat transfer and uniform temperatures within the bed. This process results in the reduction of iron oxide fines into iron, water (steam), and carbon dioxide. Reducing gas leaving the bed and some iron oxide fine particles exit the circulating fluidizable bed 54 through gas exit pipe 62 and are transferred into cyclone 52. Cyclone 52 spins the reducing gas and iron oxide fine particles in a centrifugal manner whereby the iron oxide fines separate from the reducing gas and fall through particle exit pipe 88 and into pipe 68 from which they are recycled into the circulating fluidizable bed 54. The remaining reducing gas with a small amount of entrained fines exits the cyclone through pipe 86.

Iron oxide fine particles enter the system through feed pipe 68 either from a previous circulating fluidizable bed or from the separator apparatus 8 shown in FIG. 1. As more particles are added to the fluid-like state 78, a number of the particles will fall out of the suspension to be collected at the bottom of the circulating fluidizable bed 54. These particles are subsequently removed through pipe 74 for agglomeration.

ALTERNATIVE EMBODIMENTS

While in FIG. 1 the series of circulating fluidizable beds are shown with two circulating fluidizable beds 50 and 54, it is possible to use as few as a single circulating fluidizable bed or as many as six circulating fluidizable beds. The number of circulating fluidizable beds to be used in a series is determined by the amount of time that the fine particles need to be suspended in the fluidizable bed and the amount of time it will take for the fines to traverse the system.

It is also possible to have more than one cyclone associated with a single circulating fluidizable bed. This is especially true for the last circulating fluidizable bed and cyclone application before the scrubber 16, where it is desirable prevent iron oxide fine particles from entering the scrubber.

Further, it is possible to operate the circulating fluidized beds without any orifice-containing plate 97.

SUMMARY OF THE ACHIEVEMENT OF THE OBJECTS OF THE INVENTION

From the foregoing, it is readily apparent that I have invented an improved method and apparatus for producing direct reduced iron from iron oxide fines. Currently if fines are introduced directly into the shaft reduction furnace the vast majority of the fines would be blown out into the scrubber for separation from the gas stream.

This invention provides for processing of fines in a series of circulating fluidizable beds. This configuration allows the fines to be handled and reduced more efficiently and economically than heretofore has been possible.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A system for the direct reduction of iron oxide fines in a single closed loop comprising:
   (a) means for generating a reducing gas;
   (b) a hopper for storing particulate iron oxide fines;
   (c) means for fluidizing a bed of iron oxide fines with reducing gas to form metallized iron fines and a spent reducing gas, said fluidizing means comprising multiple circulating fluidizable beds connected in series for direct reduction of iron oxide fines;
   (d) means for conveying iron oxide fines from said hopper to said fluidizing means;
   (e) means for conveying reducing gas from said means for generating reducing gas to said fluidizing means;
   (f) means communicating with said means for fluidizing a bed of iron oxide fines for separating metallized iron fines from reducing gas;
   (g) means for conveying reducing gas and iron oxide particles from said fluidizing means to said separating means; and
   (h) means for collecting the metallized iron fines.

2. Apparatus according to claim 1 wherein the means for separating the reducing gas from the iron oxide fines is a cyclone.

3. Apparatus according to claim 1 wherein said system further comprises a means for separating iron oxide fines from iron oxide pellets and lumps communicating with said hopper and said means for fluidizing a bed of iron oxide fines.

4. Apparatus according to claim 3 wherein the means for separating the iron oxide fines from the iron oxide pellets and lumps is a screen.

5. Apparatus according to claim 1, further comprising means for conveying spent reducing gas from said means for separating iron oxide particles from reducing gas to the means for generating a reducing gas.

6. Apparatus according to claim 1, further comprising means for agglomerating said metallized iron fines.

7. Apparatus according to claim 6 wherein said means for agglomerating said metallized iron fines is a briquetter.

8. Apparatus according to claim 5, further comprising means for cooling and scrubbing spent reducing gas communicating with said means for conveying spent reducing gas.

9. A system for the direct reduction of iron oxide fines in a single closed loop comprising:
   (a) means for generating a reducing gas;
   (b) a hopper for storing particulate iron oxide fines having a discharge outlet;
   (c) a means communicating with the discharge outlet of said hopper for separating iron oxide fines from the iron oxide pellets and lumps;
   (d) means for fluidizing a bed of iron oxide fines with reducing gas to form metallized iron fines and a spent reducing gas, said fluidizing means comprising multiple circulating fluidizable beds connected in series for direct reduction of iron oxide fines;
   (e) means for conveying iron oxide fines from said hopper to said fluidizing means;
   (f) means for conveying reducing gas from said means for generating reducing gas to said fluidizing means;
   (g) means for separating metallized iron fines from reducing gas communicating with said means for fluidizing a bed of iron oxide fines;
   (h) means for conveying reducing gas and metallized iron fines from said fluidizing means to said separating means; and
   (i) means for collecting the metallized iron fines.

10. A system according to claim 9 wherein the means for separating the reducing gas from the metallized iron fines is a cyclone.

11. A system according to claim 9 wherein the means for separating the iron oxide fines from the iron oxide pellets and lumps is a screen.

12. A system according to claim 9, further comprising means for conveying spent reducing gas from said means for separating metallized iron fines from reducing gas to said means for generating a reducing gas.

13. A system according to claim 9, further comprising means for agglomerating the metallized iron fines communicating with said means for collecting the metallized iron fines.

14. A system according to claim 13 wherein said means for agglomerating the metallized iron fines is a briquetter.

15. A system according to claim 12, further comprising means for cooling and scrubbing spent reducing gas communicating with said means for conveying spent reducing gas.

* * * * *

UNITED STATES PATENT AND TRADEMARK OFFICE
CERTIFICATE OF CORRECTION

PATENT NO. : 5,529,291
DATED : June 25, 1996
INVENTOR(S) : David C. Meissner

It is certified that error appears in the above-identified patent and that said Letters Patent is hereby corrected as shown below:

In Column 1, Line 52, change "fines" to -- fines, -- .

In Column 3, Line 4, change "gels" to -- gas --.

In Column 5, Line 34, change "valve" to -- compressor -- .

In Column 5, Line 39, change "system.." to -- system. -- .

Signed and Sealed this

Twenty-first Day of September, 1999

*Attest:*

Q. TODD DICKINSON

*Attesting Officer*     *Acting Commissioner of Patents and Trademarks*